United States Patent [19]

Marzocchi et al.

[11] 3,865,677
[45] Feb. 11, 1975

[54] REINFORCEMENT OF ELASTOMERIC PRODUCTS

[75] Inventors: Alfred Marzocchi, Cumberland, R.I.; Robert R. McAuslan, Seekonk, Mass.

[73] Assignee: Owens-Corning Fiberglas Corporation, Toledo, Ohio

[22] Filed: Dec. 4, 1972

[21] Appl. No.: 312,151

Related U.S. Application Data

[62] Division of Ser. No. 144,169, May 17, 1971, Pat. No. 3,741,837.

[52] U.S. Cl.............. 161/55, 161/60, 161/144, 161/156, 161/170, 161/202, 161/DIG. 4
[51] Int. Cl............................................. B32b 5/12
[58] Field of Search ....... 161/55, 60, 202, 144, 156, 161/170, 36, 37, 38

[56] References Cited
UNITED STATES PATENTS

| | | | |
|---|---|---|---|
| 3,486,546 | 12/1969 | Sidles et al.......................... | 161/144 |
| 3,546,057 | 12/1970 | Jenkins............................... | 161/144 |
| 3,608,606 | 9/1971 | Marzocchi........................... | 161/60 |
| 3,726,753 | 4/1973 | Marzocchi et al.................. | 161/144 |
| 3,770,561 | 11/1973 | Kogert................................ | 161/144 |
| 3,772,130 | 11/1973 | Marzocchi........................... | 161/55 |

*Primary Examiner*—George F. Lesmes
*Assistant Examiner*—William R. Dixon, Jr.
*Attorney, Agent, or Firm*—Carl G. Staelin; John W. Overman; Paul F. Stutz

[57] ABSTRACT

Glass cord composed of a plurality of gathered-together subelements such as filaments, strands, yarns and the like is combined with vulcanizable elastomeric stock material in a defined manner and according to prescribed methods as to yield a product in the nature of a curable preform or building block which is combinable with other similar building blocks or preforms composed of glass cord lengths and elastomeric stock to yield second and/or third stage building blocks or preforms which are ultimately of utility in erecting, constructing or building, by molding or other techniques, cured elastomeric products such as tires, belts and other rubber goods containing a glass cord reinforcement disposed or arranged in a particularly desirable manner as to reinforcedly impart to the ultimate structure the desired and/or optimum characteristics and/or properties of the glass cord and, of course, the inherent strength properties of the individual glass filaments making up the cord.

4 Claims, 9 Drawing Figures

PATENTED FEB 11 1975

REINFORCEMENT OF ELASTOMERIC PRODUCTS

This is a division of Ser. No. 144,169, filed May 17, 1971, and now U.S. Pat. No. 3,741,837, issued June 26, 1973.

The present invention relates to the field of reinforcement of rubber-like bodies. More particularly, the present invention relates to reinforcement of elastomeric rubber-like bodies with inorganic and, most preferably, vitreous reinforcement members such as strands, yarns or cords inclusive of a gathered-together multiplicity of glass filaments.

A wide variety of materials have been used over the years to reinforce rubber in the form of vulcanized products. These vulcanized products include tires, both for over-the-road vehicles and off-the-road vehicles, as well as industrial belts of all kinds including conveyor belts, drive belts, V-belts, industrial hoses, cushionings and mountings of all kinds. The term "rubber" as used herein, of course, is meant to include not only natural rubber but the synthetic rubber-like materials including butadiene styrene polymers, butyl rubbers, neoprene rubbers, as well as the newer synthetic polyisoprene, polybutadiene, ethylene propylene diene materials of the stereo specific type. Reinforcement materials used in these vulcanized rubber products include the natural occurring materials such as cotton and, additionally, yarns, strands and cords formed of such synthetic materials as rayon, nylon, polyester, polypropolene, ethylene copolymers, etc. Steel wire has also been employed, most usually in the bead region of tires and, as well, in the formation of "belt" or "breaker strips" employed in the radial-type tires favored by the European tire manufacturers. The use of glass filaments as a reinforcement for pneumatic tires has been disclosed in U.S. Pat. No. 2,184,326 assigned to the same assignee as the present application. The mentioned patent discloses broadly the utilization of glass fibers either as such or in mat form.

It is a principal object of the present invention to provide a system of reinforcement characterized in that it enables the manufacturer of final rubber products containing glass reinforcement disposed, located, arranged and composed as to lend the optimum of properties of the glass at the particular region of stress in a manner as may be arrived at predeterminedly. The reinforcement system of the present invention provides a variety of improvements and avoidance of the shortcomings of the usually employed tire reinforcements.

The conventional tire reinforcements, of course, are possessed of a number of shortcomings. Cotton is known to degrade when exposed to moisture and demonstrates severe elongation. Rayon is possessed of a low modulus and, as well, a low strength per unit cross-sectional area. The polyamides such as nylon are stronger than rayon but undergo considerable elongation and exhibit yield under load. Furthermore, the polyamides such as nylon, when employed as a tire reinforcement, are usually accompanied by the observance or detection of flat spots in the tire carcass which develop when mounted on an automobile allowed to set in cool weather, resulting in an undesirable thump when the car is put in motion. It is to be additionally noted that conventional textile reinforcement yields tires in which size varies considerably due to uncontrollable elongation and yield, resulting in inventory problems.

On the other hand, glass as a candidate reinforcement for rubber possesses a number of eminently desirable properties when considered alone. The desirable properties of glass include (a) essentially 100% elasticity, (b) essentially no yield under stress, that is, the extensibility does not exceed 3 to 4%, with 100% elastic recovery, (c) excellent dimensional stability and (d) immunity to changes inherent in varying atmospheric conditions. Unfortunately, glass also possesses properties which differ quite considerably from those of the synthetic, organic materials and accordingly presents realistic problems in connection with attempting to translate the inherently good properties into practice. It may thus be noted that glass has a stiffness measured at 322 grams per denier (gpd) whereas nylon has a stiffness ranging from 18 to 23 gpd; while polyesters range from 11 to 21 gpd and the acrylics such as ACRILAN and ORLON range from 7 to 10 gpd; while viscous rayon varies from 11 to 25 gpd. Glass also has a very low breaking elongation measuring 3 to 4 %; whereas the elongation of polyester is 19 to 30%, nylon is 16 to 40%, ACRILAN is 36 to 40% and viscous rayon is 9 to 30%. Glass also possesses a high specific gravity measuring 2.54 compared to 1.14 for the principal polyamide nylon and, as well, the acrylics; 1.5 being the value for rayong and KODEL and DACRON measuring from 1.22 to 1.38 and representing two typical polyesters. Additionally, toughness on a denier basis reveals a comparison of glass to nylon of 0.75, rayon 0.20, DACRON polyester 0.5 and ORLON (an acrylic) 0.4.

It can be seen from the above that glass possesses advantageous as well as disadvantageous properties, considered from the standpoint of a candidate reinforcement for elastomeric rubber products such as tires, belts, both conveyor and power transmission, etc.

It is a general object of the present invention to provide a reinforcement technique calculated to achieve the fullest utilization of the advantageous properties of glass, while at the same time overcoming or masking those properties of glass which are less advantageous.

It is a particular object of the present invention to provide a reinforcement technique which features a building block approach to the fabrication of elastomeric rubber products, by which is meant a technique of preparing preforms which may be in the form of planar rectangles, elongate strips of varying thicknesses and widths, elongate sheets of varying lengths, widths and thicknesses and, as well, other shapes of predetermined dimensions containing a precalculable and predetermined amount of glass disposed in the preform in a preselected manner; the preforms or building blocks containing prescribed lengths of glass in the form of cords, yarns, strands or any of the foregoing of particular ply makeup; all of the foregoing being calculated in a manner as permits the preforms to be combined in a desired manner as to yield the ultimate vulcanized product containing the glass reinforcement in the ultimately desired location, selected, of course, upon consideration of the static and dynamic forces and tensions to which the ultimate product is likely to be subjected, with the glass located as to best meet and/or accommodate these particular forces, tensions and/or stresses.

It is a significant object of the present invention to provide a method of producing preforms or building blocks comprising various geometric cross-sectional lengths of vulcanizable elastomeric stock containing glass therein in a preselected form.

It is still another object of the present invention to provide a method of combining so-called first-stage preforms with like preforms to result in composite second-stage preforms.

It is a particular object of the present invention to provide a multi-layer sheet material composed of a vulcanizable elastomeric stock containing within each layer a plurality of lengths of chopped glass cords; the makeup of the glass in each layer being different in terms of the size of the cord, the length of the cord, the angular disposition of the cord within the layer as well as other parameters or factors.

It is an object of this invention to provide a method of producing a vulcanizable elastomeric sheet material containing lengths of glass in the form of cords, strands, yarns, fibers or the like; the cords being arranged in different arrays of orientation within the sheet material.

The foregoing, as well as other objects of the present invention, will become apparent to those skilled in the art from the following detailed disclosure taken in conjunction with the annexed sheets of drawings on which there are presented, for purpose of illustration only, several varied embodiments of the present invention.

Figure 8:
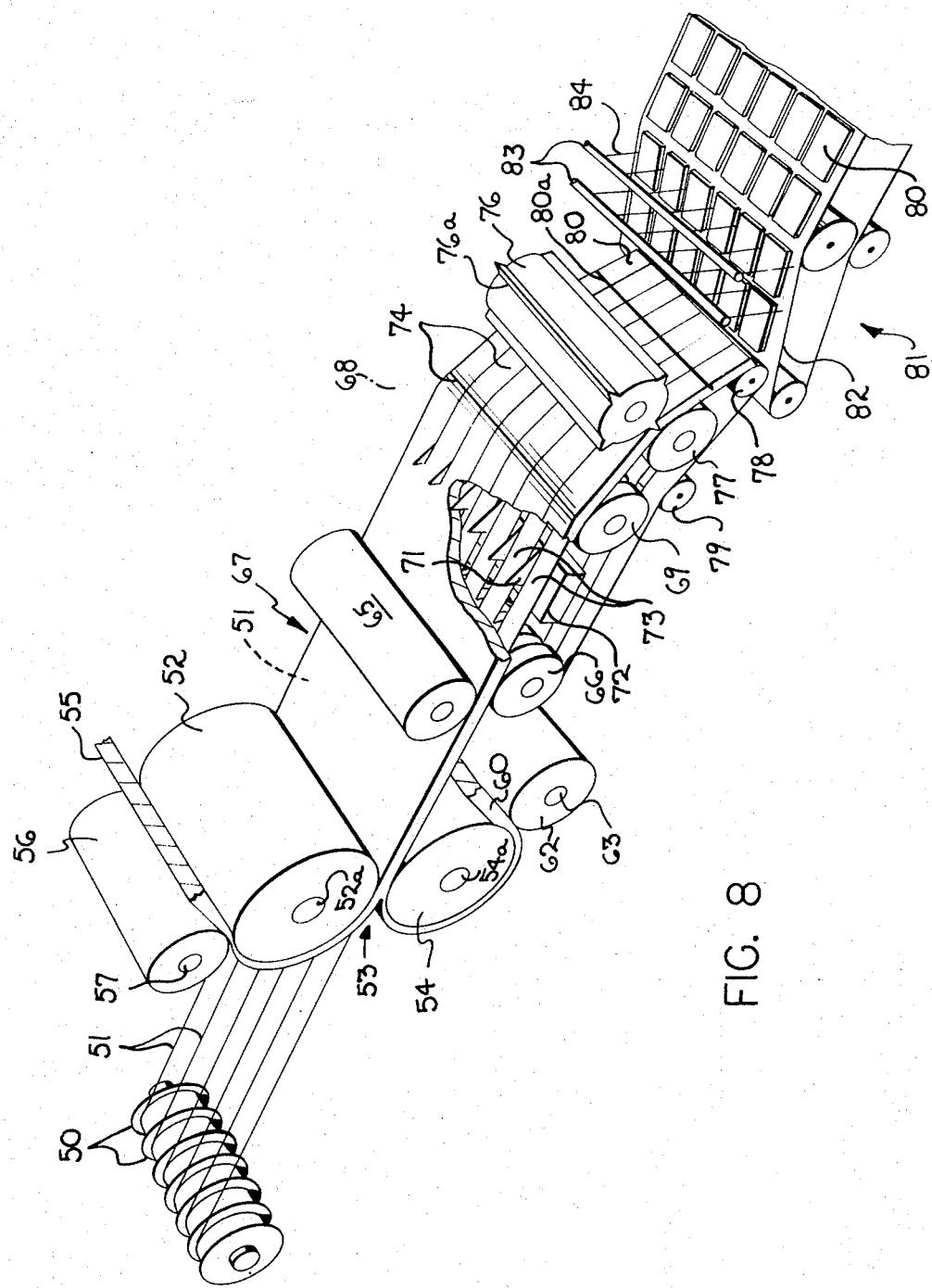
Figure 9:
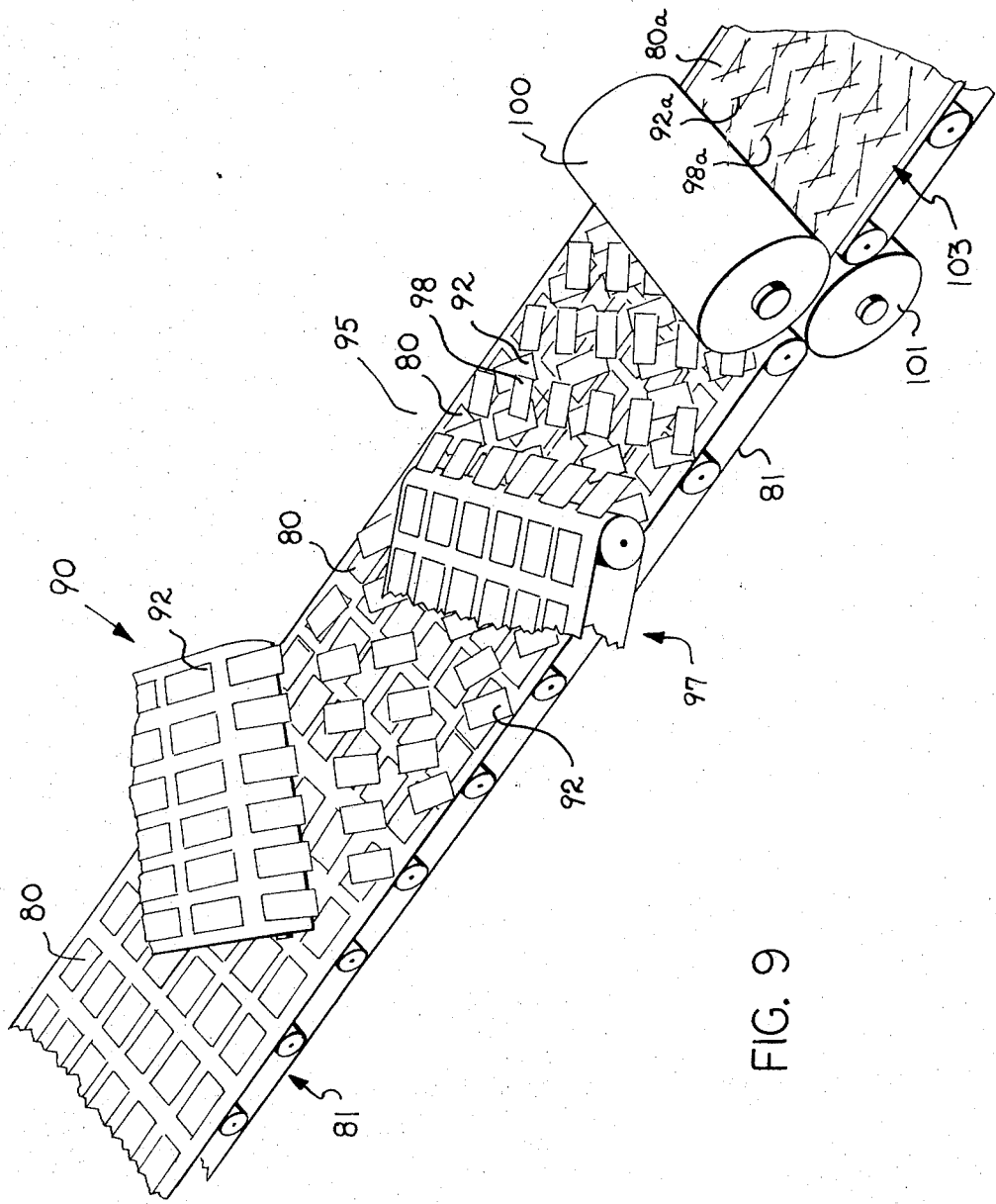

FIG. 8 is a perspective view of an array of apparatus components operative to carry out a technique of stock preparation in accordance with an embodiment of the present invention; and FIG. 9 is a perspective view similar to FIG. 8, but showing a subsequent processing operation constituting a combining of preforms in order to produce an ultimate sheet material in accordance with a preferred embodiment of the present invention.

Viewed most basically, the present invention envisions a technique for locating glass cord reinforcement composed of a plurality of glass filaments, strands or yarns in a desired preselected manner within the ultimately desired vulcanized structure of predetermined physical configuration in order to achieve a maximization of the inherent and most desirable reinforcement properties of the basic glass element.

Figure 1:
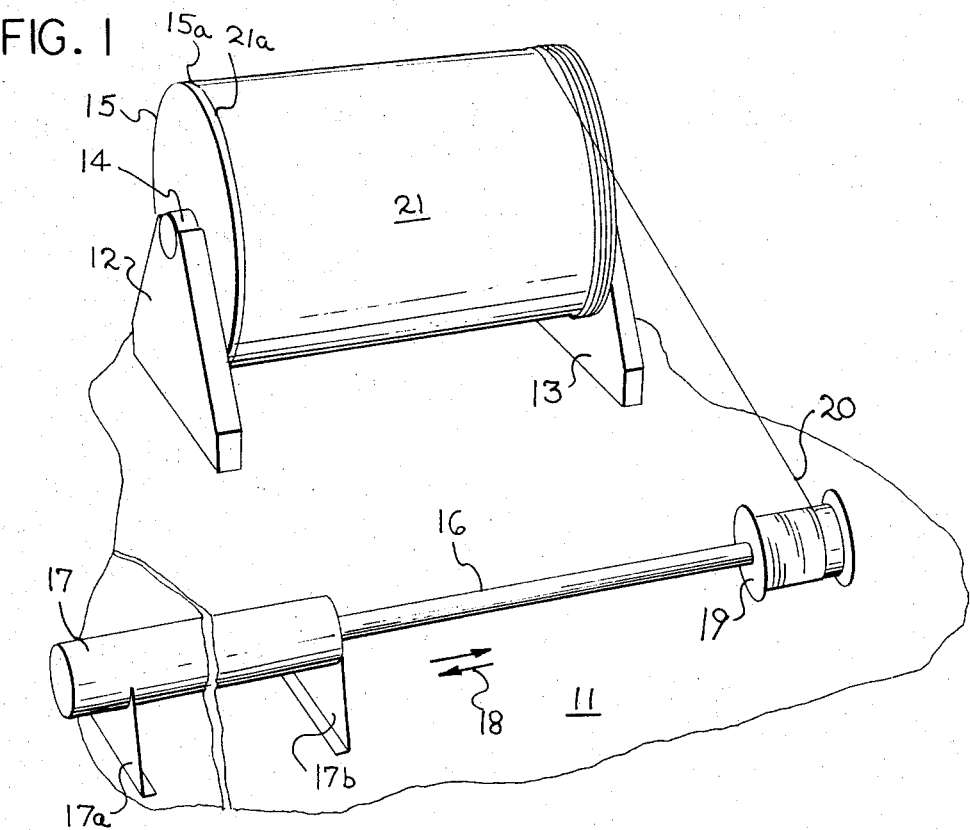
FIG. 1 is a perspective schematic view illustrating the practice of a method representing one embodiment of the present invention.
Figures 2, 3:
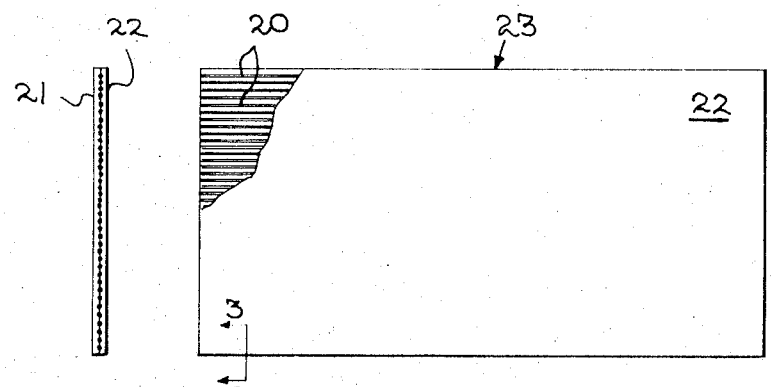
FIG. 2 is a top plan view of a sheet material resulting from the practice of the method illustrated in FIG. 1.
FIG. 3 is a sectional view taken on the line 3—3 of FIG. 2.

Referring now more specifically to the drawings, there is disclosed in FIG. 1 a support table 11 bearing spaced upstanding journal bearings 12 and 13 having mounted rotatably thereon a shaft 14, keyed to which is a cyindrical drum 15 having outer surface 15a. A shaft 16 situated parallel to the shaft 14 and drum surface 15a has one end located within an elongate cylinder 17 suitably supported on flanged support members 17a and 17b. The cylinder 17 is suitably controlled by air or fluid in a well-known manner to accomplish axial movement of the shaft 16 to and fro in the direction indicated by the arrows 18. Rotatably mounted on the end extremity of the shaft 16 is a spool 19 serving as a reservoir for a continuous length of cord 20 formed of a multiplicity of glass filaments in the form of strands or yarns combined together in a known manner. As a first step in the practice of the present invention, a thin layer of rubber 21 is releaseably wrapped about the outer cylindrical surface 15a of the drum 15. A continuous length of the glass cord 20 drawn from spool 19 is wound about the drum 15 and about the layer of vulcanizable elastomeric stock carried thereby by the expedient of rotating the drum while the length of cord is unreeled from the spool 19 and wound onto the drum in the manner illustrated in FIG. 1. Repeated winds of the glass cord 20 are in closely spaced to contacting relationship as controlled by leftward movement of the spool 19 as carried by shaft 16, controlled in movement in the manner indicated by the arrows 18 by air or fluid cylinder 17. When the spool 19 is situated to the left, wherein the length of cord is being wound onto the drum adjacent the leftmost edge 21a of the layer of rubber 21, the cord is cut and the spool 19 moved by operation of the cylinder 17 to the rightmost position, ready for a repeated unwinding of a continuous or endless length of cord 20. The drum bearing the layer of rubber and a continuous wind of glass cord is thence again rotated slowly while there is applied about the cord and coextensively with the layer 21 a second layer 22 (FIG. 3) of rubber. The layer 22 is precut as is the layer 21 to a size corresponding generally to the circumferential area of the drum 15. The sheets 21 and 22 which form the inner and outer layers on the drum 15 are knitted together by usual means such as a knurled knitting tool and application of a rubber solvent such as methyl ethyl ketone. Toluene and naptha can be used in place of methyl ethyl ketone. The laminated or sandwich structure on the drum 15 is then removed by appropriate cutting knife drawn from lateral edge to lateral edge across the drum surface whereupon the structure is removed as a rectangular sheet 23 (FIG. 2) and laid on an appropriate table. Reference to FIG. 2 shows the rectangular sheet 23 with a portion of the sheet or layer 22 broken away to show the side-by-side winds of cord 20. FIG. 3 is an edge view of the sheet 23, while FIG. 4 is an enlargement of a section of the edge view.

Figure 4:
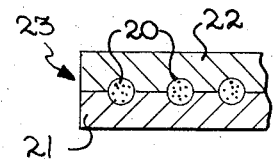
FIG. 4 is an enlargement of one segment of the sheet material shown in FIG. 3.

In FIG. 4, the sheets 21 and 22 are designated as is the spaced side-by-side winds of glass 20. Viewing FIG. 4, it will be appreciated that the thickness of the sheet 21 as well as the thickness of the sheet 22 may be predeterminedly selected, either being the same thickness or a different thickness. Furthermore, the makeup of the cord 20 can, of course, be varied in a predetermined manner, either in terms of the number of yarn and subelement strand members or the number of filaments making up the strands and, as well, the twists employed in the plying and combining of the filaments, strands and yarns in making up the cord. The sheet 23 or similarly composed sheets may be employed as components of tires built on conventional tire building equipment or in belt manufacturing operations such as conveyor belts or the like; it being appreciated that the dimension, that is, the size in length and width, of the sheet 23 can be varied by appropriate selection of the drum size and, of course, appropriate cutting of the initial vulcanizable rubber sheets. The sandwich laminate structures 23 may also be cut in bias fashion, as is well known in the rubber industry, in order that the angular relationship of the essentially mutually parallel cords may be varied in the incorporation or assembly of the bias cut sheets onto, for example, tire building drums. The sheets 23 may also be subdivided into breaker strips or tread reinforcing plies, bias cut in appropriate fashion as will provide the cords in the desired ultimate angular disposition with respect to the particular reference line, usually the peripheral centerline of the tire. Tread reinforcing plies, e.g., belt plies, produced as described herein embody the advantage of being unitary multiple-ply structures featuring particular cord angles in each ply, if desired, as will enhance tire performance. These belt plies are particularly useful stabilizers in the building of radial tires having carcass cords radially disposed in the carcass.

In accordance with a further embodiment of the present invention, the sheet 23 (see FIG. 5) is cut into a plurality of strips 23a, 23b, 23c, 23d, 23e, 23f, 23g and 23h. Each of the strips have cords of glass embedded therein, running lengthwise of the strips. The strips, for example 23g, are then in appropriate manner subdivided into smaller segments, identified by the reference numeral 24a, having any predeterminedly desired dimensions. The pieces 24a may then be combined with each other, for example, in the manner illustrated in FIG. 6. The pieces or segments 24a each have a corresponding plurality of lengths of glass cord 20 embedded therein and shown in dotted outline. The length of the cord in a segment 24a will depend upon the distance between the cuts 24b into which the strip 23g is subdivided (see FIG. 5). The layup of segments 24a provide a first layer in which the cut edges 24b are located in edge-to-edge or abutting contact. An upper layer of segments 24a are laid on top of the first layer in edge abutting relationship but with the edges offset such that one abutting edge, identified for reference purposes as 24c, lies midway between the abutting edges 24b of the segments making up the lower layer. It will be appreciated that the dimensions of the strips 23a-23h and, as well, the distance between the cuts 24b may be varied to provide segments 24a of a wide variety of dimensions; the ultimate purpose of which is to provide a multipiece assembly in which there is, in effect, a plurality of lengths of glass cord of predetermined length disposed in a particularly predeterminedly desired angular relationship with respect to the overall dimension of the composite assembly 25 (FIG. 6).

Figure 6:
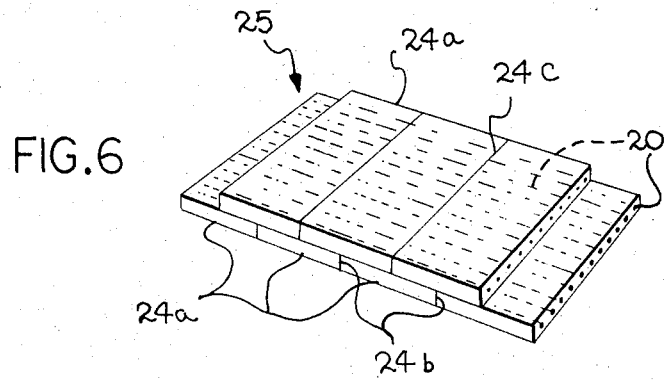
FIG. 6 is a perspective view schematically illustrating a stock layup technique employed in accordance with an embodiment of the present invention.

Viewing FIG. 6, it will be appreciated that the rubber sheets, of which the pieces 24a are composed, are vulcanizable and are coherent with like pieces when placed in surface abutting contact, as are the lower and upper layers of pieces 24a. A rubber solvent sparingly applied to the surface will aid in the formation of the composite structure 25. In its simplest form, the composite structure may be composed of what may be described as a rectangular molding block which may be further described as a thin multi-component brick or slab. By reason of the inherent tacky nature of the unvulcanized rubber, it will be appreciated that multi-component bricks or slabs of varying makeup may be produced. Thus, the laminate sheet members 23 may be subdivided into strips such as 23a-23h of any given width. The strips may, in turn, be subdivided into segments such as the segments 24a of preselected dimension. This usually, in accordance with the present invention, will vary from one-half inch up to about six inches. Elements 24a of preselected dimension are then combined somewhat in the manner illustrated in FIG. 6 to thereby produce multi-component slabs having any desired length of glass cord, depending upon the distance between spaced cuts producing the edges 24b in producing the segments 24a.

Figure 7:
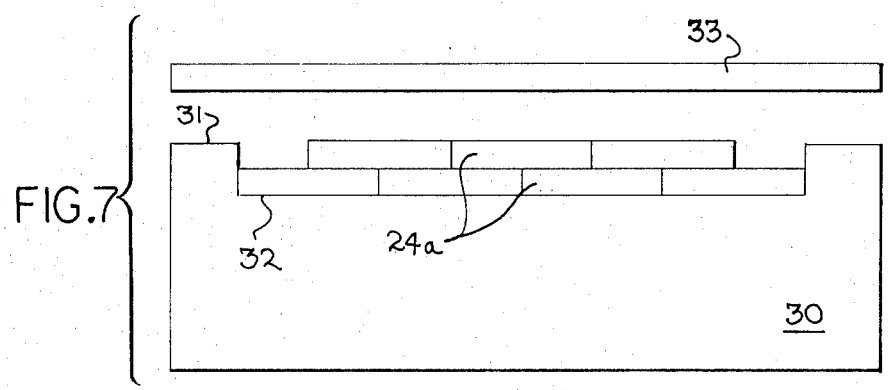
FIG. 7 is a side elevation view illustrating a further molding step employed in accordance with one embodiment of the present invention.

FIG. 7 is a schematic side elevation view in the manner of producing a vulcanized test specimen which can be tested to determine the effect of cord length and cord composition on the strength properties of an elastomeric body containing same. FIG. 7 will be described in more detail in a later example appearing herein. It may be stated here that reference numeral 30 represents a metal die having in its upper surface 31 a depression or female cavity 32 in which is situated a brick or slab made up of a multiplicity of segments or pieces 24a. The multi-component slab is located in the cavity 32 whereupon top plate 33 is lowered, effecting closure of the cavity 32, whereupon the whole unit is heated by suitable means, effecting cure of the assembled array of segments 24a. The cured end product then serves as a "blank" from which may be "die cut" a "dumbbell" specimen for tensile testing in a manner described in the later example.

Reference may now be had to FIGS. 8 and 9 wherein is disclosed an array of apparatus elements designed in concert to produce, in accordance with the present invention, a sheet material or building block containing lengths of glass cord of predetermined length and angular disposition from a supply of continuous lengths of glass cord and a supply of appropriate rubber stock.

Referring first to FIG. 8, there is shown at the left-hand extremity an array of spools 50, each containing a supply of glass cord comprising, as described hereinbefore, an assembled plurality of glass strands or yarns, in turn made up of a multiplicity of glass filaments. The cords are preferably impregnated, in a manner to be described, for ready assimilation into the rubber stock or they may alternatively be subjected to an impregnation upon withdrawal from the supply spools 50, albeit not particularly disclosed herein. The cords in spaced, parallel array are identified by the reference numeral 51. The cords are drawn from the supply spools 50 by a pair of counter-rotating rollers 52 and 54. The rollers 52 and 54 rotate in the direction indicated by the arrows and each bear on their respective surfaces a layer of rubber. The layers of rubber and the parallel array of cords converge at the "nip" or line of convergence of the rubber carried by the spaced rollers; the nip being identified by the reference numeral 53. The rollers or drums 52 and 54 are rotatably mounted on suitable shafts 52a and 54a. The layer of rubber carried on the surface of roller 52 is provided by feeding a supply of appropriate elastomeric stock 55 into the nip region between roller 52 and cooperating roller 56 which rotates in an opposite direction to roller 52 and is spaced slightly therefrom a distance which can be controlled by adjustment of shaft 57 upon which drum 56 is mounted for rotation. The elastomeric stock 55 is worked in passing between rollers 52 and 56 and is spread out evenly across the surface in a manner well understood. Similarly, a supply of stock 60 is fed between lower roller 54 and a cooperating roller 62 in parallel relationship therewith and mounted to define an appropriate predetermined distance between the surfaces as controlled by disposition of the adjustable shaft 63 which is rotatable and upon which roller 62 is mounted. The rollers 54 and 62 cooperate to convert the feed stock 60 into a thin layer carried on the surface of roller 54 which convergingly meets the like layer on roller 52 carrying therewith the parallel strands or yarns 51, shown in dotted outline, downstream from the rollers 52 and 54. Tension in the spaced yarns or cords 51 is, in part, maintained by the counter-rotating rollers 65 and 66 which are mounted downstream in counter-rotating, horizontally disposed, vertically spaced relationship, as shown, and between which passes the rubber sheet material 67 formed by the convergence of the layers of rubber converging in the nip region 53. The space between rollers 65 and 66 is adjustable to finally gauge the thickness of the sheet material 67 and, as indicated, to maintain tension in the sheet material 67 and specifically the cords 51. Further downstream, the sheet material 67 passes between another pair of cooperating vertically spaced drum rollers 68 and 69 which, in array, are situated slightly below the horizontal plane of the sheet material 67. The purpose for this relationship is to provide for positive cutting engagement as between the sheet material and a plurality of upstanding, horizontally spaced cutting knives 71 projecting upwardly from knife support bar 52. Driven parallel spaced conveyor belts 73 located betwen the knives serve to support the rubber sheet material as it is sliced into strips 74 by the array of upstanding knives disposed in transverse array with respect to the downstream moving sheet material.

The array of rollers 52, 56, 54 and 62 is, for ease of illustration and understanding, shown schematically, albeit that commercially available calendering equipment is usable in actual production.

The strips 74, upon emergence from guide rollers 68 and 69, pass in a somewhat downwardly inclined direction between a pair of counter-rotating drum rollers 76 and 77 mounted on suitable driven shafts. The path of the strips is determined and aided by a conveyor belt arrangement, previously identified by the reference numeral 73, comprising a plurality of side-by-side belts which proceed continuously over roller 66, bar element 72, drum roller 69, drum 77, reversely around roller 78 and thence under drum 77, over idler roller 79, thence under drum roller 69 and finally upwardly reversely to the point of origin about drum roller 66. The drum 76 has, extending radially from its surface, a plurality of parallel spaced cutter blades 76a which press against roller 77 and thus cut the strip passing between rollers 76 and 77. The spacing of the cutter blades 76a, which are disposed parallel to the axis of rotation, is selected to correspond to the dimension or length into which it is desired to cut the strips 74. When the strips have been cut into segments 80 by cut 80a, they proceed, as shown, onto a conveyor 81 composed principally of an endless conveyor belt 82 which proceeds about an array of rollers in conventional fashion. Situated above the conveyor belt are a pair of overhanging horizontal support bars 83 upon which vertically depend a plurality of relatively flexible fingers 84 which serve to insure alignment of the plurality of generally rectangular segments 80 in the direction of travel. The spacing of the cutter blades 76a is desirably selected such that the dimension of the segments along the path of travel is somewhat longer than the width dimension of the strips 74. The speed of the conveyor system 81, principally the conveyor belt 82, is controlled slightly faster than the belts 73 so that the slabs 86 assume a somewhat spaced and spread out relationship as shown in the left-hand segment of FIG. 9. Reference numeral 90 identifies the delivery end of a conveyor arrangement like the conveyor arrangement 81. As can be seen, the conveyor 90 proceeds at somewhat of an angle to the axis of the principal conveyor arrangement 81 and is shown delivering a plurality of segments or pieces 92 in angular overlapping relationship with the segments 80. It will be appreciated that the segments 92 are the product of the operation of an array of apparatus elements as illustrated in FIG. 8. The slabs or pieces 92 and the pieces 80 which underlie the pieces 92 are angularly disposed thereto proceed in the manner illustrated to approximately the position identified by the reference numeral 95. At this point, there is situated another conveyor discharge 97 angularly disposed to the conveyor arrangement 81 and generally opposite to the angular relationship of the conveyor arrangement 90. Pieces or segments 98 carried on the conveyor arrangement 97 are the product of the operation of an array of apparatus elements upon a supply of glass cord and stock rubber as above described in connection with FIG. 8. The slabs 98 pass from the conveyor arrangement 97 into overlapping or overlying and angular relationship with the segments or pieces 92 and the segments or pieces 80. The overlapping array of angularly disposed segments proceed on the conveyor downstream, passing between a pair of counter-rotating rollers 100 and 101 mounted for rotation on suitably driven shafts which are spaced a preselected distance in order to compress the array of segments, pieces or slabs together into a relatively unitary sheet identified by the reference numeral 103. As to the sheet 103, the reference numerals 80a, 92a and 98a respectively identify the axes of the rectangular segments or pieces proceeding from the conveyor arrangements 81, 90 and 97.

It will be appreciated, by reason of the above, that the sheet 103 thus contains embedded therein mutually parallel cords of glass generally disposed axially with respect to the individual segments or pieces 80, 92 and 98; the angular relationship of the cords in the pieces 80, 92 and 98 being determined by the angular relationship of the conveyor systems, particularly the conveyor systems 90 and 97 with respect to the conveyor system 81.

It will further be appreciated that the relative angular relationship of the longitudinal axis of the segments, and correspondingly the angular relationship of the cords embedded therein, may be controlled by the employment of members 83 with depending fingers 84. The ultimate objective, of course, is to provide a sheet material composed principally of vulcanizable elastomeric matrix having embedded therein cords of glass, the length of which can be predeterminedly controlled, and the cords also being predeterminedly arranged at different angular relationships with respect to the longitudinal axis of the principal sheet 103. The sheet 103 can be bias cut or subdivided into any size sheets as desired, being used thereafter, of course, as a former or building block in the layup of multiple pieces and formers formed of vulcanizable elastomeric stock rubber and thereafter vulcanized or cured in a desired mold or other method of vulcanization to achieve a molded cured product, such as a tire, a conveyor belt, a V-belt, a shock absorber or any one of a variety of mechanical rubber products. The ultimate product, of course, will be characterized in that it contains glass reinforcement which is located in a desirable location as opposed to indiscriminate location. The length of the glass can be predeterminedly controlled as can the angular relationship of the glass cords in order, of course, as indicated hereinabove, that the glass may contribute to the finally configurated part the maximum in terms of the reinforcement capabilities of the basic glass filament or the composite glass strand, yarn or cord.

It has been determined in accordance with the present invention that the quantity of glass, the location of the glass, the angular disposition of the glass cords, in terms of aggregate array, and the length of the glass cord, all have an effect on the physical properties exhibited by the ultimately vulcanized molded piece. A significant utility for the composite sheet material 103 is in fabricating unvulcanized or green tread reinforcing ply or breaker strip structures. Thus, it will be understood that the sheet material 103 may be subdivided into a strip having a length corresponding to the circumference of the ultimate tire and a width corresponding to approximately the tread region of the ultimate tire. The strip may be wrapped about the previously applied carcass elements and just prior to the application of the "camelback" or tread stock, providing, in effect, a multiple layer, tread reinforcing ply in a single step. Thus, viewed in section, the sheet material as cut into the vulcanizable belt plies will be seen to be composed of a lower layer, a middle layer and an upper layer, each different from the other in terms of the angular relationship of the mutually parallel glass cords in each of the layers. It will be appreciated that the length of the cord in each of the layers can be varied, depending upon the appropriate operation of the technique and apparatus illustrated in FIGS. 8 and 9.

The glass filaments of which the cords 51 are composed are manufactured and marketed commercially. The fibers are drawn from a molten supply of glass contained in a platinum container having a large plurality of very fine holes in the bottom thereof from which the molten glass is drawn at high rates of speed which attenuate the glass into extremely fine diameter. The glass filaments are pretreated as drawn from the platinum container, usually called a "bushing," with a size serving to enhance the compatability of the ultimate glass yarn with the elastomeric matrix for which it is best. A suitable size is composed of 0.5 – 2.0 percent by weight of gamma-aminopropyltriethoxy silane, 0.3 – 0.6 percent by weight of a lubricant and the remainder water. Other amino silanes may be employed as a size material. The drawn filaments, as indicated earlier herein, are combined with like filaments to form a strand. The number of filaments to form a strand may vary from several hundred upwards to a couple thousand. The filaments may be twisted or left in untwisted relationship in forming the strand. Thereafter, a plurality of strands are combined with or without twist to form a yarn. In like fashion, a multiplicity of yarns may be combined, with or without twist, to form an ultimate cord such as the cord 51 (FIG. 8). At some stage in the formation of the cord or even after the formation of the cord, the glass element assembly is desirably impregnated with an elastomeric base impregnant in order to improve further the compatibility of the cord of glass subelements into the ultimate elastomeric product. The impregnant may be an appropriate elastomeric material dissolved in a suitable solvent for that particular compound to form a somewhat viscous liquid which can be coated onto or impressed into the interstices of the cord by suitable immersion and/or immersion coupled with distortion of the cord and subelements to improve impregnation. A suitable impregnant is listed in Table 1 below.

TABLE 1

|  | Parts by weight |
| --- | --- |
| Neoprene rubber | 100 |
| Powdered magnesium oxide | 4 |
| Powdered zinc oxide | 5 |
| Channel black | 15 |
| Thiate B (trialkyl thiourea accelerator) | 1 |

The above ingredients are suitably mixed on a conventional rubber mill combined with a suitable or appropriate rubber solvent in amounts as will form a liquid impregnant bath of convenient viscosity. An equally suitable impregnant is composed of about 60 parts by weight of 38 percent dispersed solids inclusive of a butadiene-styrene-vinyl pyridine terpolymer latex, a butadiene styrene latex and a resorcinol-formaldehyde resin in combination with about 40 parts by weight of water. The 38 percent dispersed solids system is marketed under the trade name "LOTOL 5440" by Uniroyal, formerly U.S. Rubber Company.

To illustrate the effect of glass cord disposition, makeup and length of cord, a number of cured test slabs were prepared generally in the manner illustrated in FIGS. 1–6.

EXAMPLE I

Figure 5:
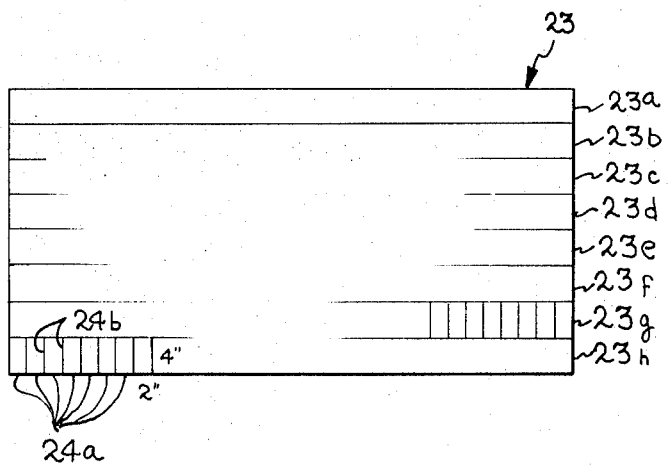
FIG. 5 is a plan view schematically illustrating a technique representing a further embodiment of the present invention.

A layer of stock was applied to a drum, such as the drum 21 as shown in FIG. 1. Following this, a continuous cord composed of three strands of 204 glass filaments each was, in the manner illustrated in FIG. 1, laid down around the layer of rubber at a spacing of about 16 ends per inch. A top layer of rubber was applied and stitched down. The ultimate laminate measured 0.048 inches in thickness, with each layer of rubber stock measuring 0.020 inches. The laminate as a sheet, generally as illustrated in FIG. 2, was removed from the drum and cut up into strips in the manner of FIG. 5 and thereafter the strips subdivided, also as shown in FIG. 5, whereupon an assembly in the manner of FIG. 6 was constructed. The cutting into strips and into lengths was carried out in the manner described in connection with pieces 24a of FIGS. 6 and 7. The layup of the pieces was carried out as shown in FIG. 6; the cord lengths 20 measuring 1 inch. The plurality of laid up pieces was molded into a slab as shown in FIG. 7 and thereafter the slab was cut into dumbbell specimens with the cord length longitudinally thereof. Similar slabs were prepared but made up of different sized pieces, specifically as to glass cord length. The molded slabs contained approximately 15 percent by weight fiber glass based on the total weight of cord and rubber. The dumbbell specimens were subjected to conventional testing employed in the rubber industry and the results of the test are contained in Table 2 below.

TABLE 2

| Cord Length | Tensile | Elongation | Modulus | | | | Tear |
|---|---|---|---|---|---|---|---|
| | | | 20% | 40% | 60% | 80% | |
| None | 3400 | 525 | — | — | — | — | 225 |
| ¼" | 1180 | 80 | 360 | 745 | 1065 | 1140 | 228 |
| ½" | 1600 | 45 | 700 | 1010 | — | — | 270 |
| 1" | 2915 | 25 | 2135 | — | — | — | 467 |
| 1½" | 4645 | 20 | — | — | — | — | 643 |
| 2" | 7205 | 20 | — | — | — | — | 475 |
| 3" | 9500 | 20 | — | — | — | — | 569 |
| 4" | 9885 | 20 | — | — | — | — | 557 |
| 6" | 10035 | 20 | — | — | — | — | 647 |

Fiber glass content — 15%
Rubber stock — 85%

The foregoing table demonstrates the effect of cord length on tensile strength, elongation and modulus, as well as tear strength. In the above test, the tensile pull, of course, is in alignment with the axis of the dumbbell specimen and, of course, with the axis of the cords embedded therein.

In accordance with a further embodiment of the present invention, it is envisioned and proposed that building block members in the form of vulcanizable elastomeric stock containing glass cords embedded therein may be prepared in a manner as will yield the slab in the form of a sheet material of some thickness and in which the glass elements in the form of yarns, strands or cords are oriented vertically; that is, normal to the planar surfaces of the sheet material. This can be accomplished by starting with a sheet material in which the yarns, strands or cords are oriented horizontally and perhaps even longitudinally of the sheet material. The sheet material is passed between a pair of calender rolls, in which one roll is controlled to rotate at a much higher rate of speed than the other, whereupon the cords are displaced due to the distortion of the rubber in passing between the spaced counter-rotating rolls in a manner that on the downstream side of the rollers the cords, strands or yarns would have been displaced into a vertical relationship with the facing surfaces of the slab or sheet material.

While we have disclosed in considerable detail the manner of carrying out our invention, both in terms of formulation and process steps, it will be appreciated that variations and substitutions may be made without, in fact, departing from the inventive concept. Accordingly, all such modifications, variations and substitutions in material are intended to be included within the scope of the invention.

We claim:

1. An essentially continuous sheet composed of a vulcanizable elastomeric material, said sheet being subdividable into smaller units of preselected dimension and adapted to be combined with other like pieces of preselected dimension to form, in aggregate, a vulcanizable preform for vulcanizing into a desired molded configuration, said sheet comprising:
   a plurality of unitized layers of vulcanizable elastomeric material in generally face-to-face registration making up the thickness of said sheet material,
   one of said layers of vulcanizable elastomeric material including embedded interiorly therein an array of separate lengths of chopped glass cords arranged in generally mutually parallel relationship and
   another one of said layers of vulcanizable elastomeric material including embedded interiorly therein an array of separate lengths of chopped glass cords in generally mutually parallel relationship, said latter array of chopped lengths being angularly disposed to the array of chopped lengths in the first-mentioned layer.

2. A sheet material as claimed in claim 1, wherein the lengths of chopped cord range from about ¼ inch to about 6 inches.

3. A sheet material as claimed in claim 2, wherein the lengths of cords are each formed of a multiplicity of untwisted glass filaments.

4. The sheet as claimed in claim 1 which includes a third layer of vulcanizable elastomeric material unitized with said other layers and contributing to the thickness of said sheet material, said third layer including a vulcanizable elastomeric material having embedded interiorly therein an array of separate lengths of chopped glass cords in generally mutually parallel relationship, said array of lengths being angularly disposed to the array of chopped lengths in the first layer or the second layer.

* * * * *